United States Patent Office 3,817,859
Patented June 18, 1974

---

3,817,859
WASTE WATER TREATMENT METHOD
Jack F. Tate, Houston, Tex., assignor to
Texaco Inc., New York, N.Y.
No Drawing. Filed Mar. 29, 1972, Ser. No. 239,337
Int. Cl. C02b 5/06; C23f 11/10; E21b 43/25
U.S. Cl. 210—57
2 Claims

ABSTRACT OF THE DISCLOSURE

A method of disposing of certain process effluent waste streams by injecting them into subterranean formations which entails inhibiting the formation of solid precipitates which plug the subterranean formation. The method of inhibiting the formation of precipitates involves lowering the pH of the mixed streams and optionally removing any organic phase created thereby before injection.

FIELD OF THE INVENTION

This invention pertains to the field of subterranean disposal of liquid waste streams.

BACKGROUND OF THE INVENTION

Certain effluent streams from industries are waste and have no apparent use. These streams must be disposed of, but to dispose of them on or near the surface of the earth might cause considerable pollution problems. In addition, treatment of the streams so that they may be discharged legally and safely into streams or waterways is at times prohibitively expensive. One solution is to inject these streams into subterranean formations whose geological characteristics preclude the possibility of contact with surface or substerranean fresh water formations. These usually rather deep formations invariably contain highly mineralized water. The formations themselves are usually dolomite, sandstone or limestone. The formations useful for injection of waste streams must be permeable to fluids. That is, the formation rock must be made up of interconnected pores which allow fluids to flow through them. These pores are quite small, ranging from 0.5 to 20 microns in diameter on an average.

Due to the small size of the pores in the formation rock, they are quite easily plugged by undissolved particles present in any fluid injected into them. If many undissolved particles are present, the formation may plug extensively and the injectivity of the disposal stream will decline. Injectivity is a measure of the amount of fluid which will flow through a given area under a constant pressure differential.

A major reason for failure of many deep well industrial waste disposal wells is plugging of the formation face with solids present in the injected stream or formed due to incompatibility of the stream with formation material or connate water. Such solids may come from four sources: (1) suspended solids and emulsions such as clay from river water used in an industrial process present in waste stream as a result of poor surface treatment, for instance, coagulation and sedimentation, (2) solids formed by the mixing of two or more solids-free streams by combination of an ion from one with an ion from the other to form a precipitate, (3) solids formed by mixing of the stream(s) with formation (connate) water at the formation face and (4) solids formed by precipitation when certain streams contact and react with the formation rock itself. Suspended solids and emuslion [(1) above] may be removed by more effective surface treatment using techniques well known in the art. My invention is directed to solving the plugging problems posed by the last three situations mentioned above.

Alkaline, as used in this application, refers to pH values above seven (7). Acidic, as used in this application, refers to pH values below seven (7).

SUMMARY OF THE INVENTION

My invention is a process of disposing of separate aqueous waste streams or mixtures of waste streams wherein the mixtures are alkaline and said waste streams or mixtures of streams are capable of forming a solid precipitate upon contact with each other, substerranean formation rock, or subterranean formation water in an alkaline medium, by injecting these streams separately or mixed into a subterranean formation the improvement which comprises lowering the pH of the streams to the acidic range before the streams contact the subterranean formation so as to inhibit the formation of any precipitate or dissolve any precipitate already formed. In certain cases it may be necessary to remove by conventional means any organic phase formed as a result of lowering the pH value.

DESCRIPTION OF THE PREFERRED EMBODIMENTS

While it is difficult to classify streams according to chemical types, in order to detail the operation of my invention it is necessary to make certain arbitrary classifications. These classifications are not meant to limit the scope of my invention, however, since the particular constituents mentioned are only illustrative of many equivalents which would be solvable by the method of my invention.

Refineries, to cite a typical example, may have at least two general types of waste streams which could be disposed of by injection into deep formations. These streams will be arbitrarily labeled Group I streams and Group II streams.

Group I streams

Group I streams may contain some or all of sulfides, cresylates and soluble iron salts. The separate Group I streams have pH values in the alkaline range. The various streams classified here in Group I also may contain other ingredients, but the ones mentioned are adequate to illustrate the problems encountered. It must be reiterated that there may be several streams from a given refinery classified in Group I, each of which may have a different composition from the other Group I streams, and each of which may contain one or more of the constituents mentioned above in various proportions.

Group II streams

Groups II streams are composed of alkaline earth metal ions such as calcium, barium, and magnesium as well as iron. Some of these streams also have pH values in the alkaline range. The most definite difference between Group II and Group I streams is that Group II streams have no organic constituents in significant quantities. Again, as in Group I, each Group II stream may differ from other Group II streams and contain one or more constituents in varying proportions.

Formation of precipitates which will plug the injection wells may arise in a variety of ways:

1. Mixing Group I streams with other Group I streams. Here iron sulfide may precipitate and plug the formation.
2. Mixing Group II streams with other Group II streams. Here iron hydroxide may precipitate out.
3. Contacting the injection horizon with Group I streams may cause reaction between the formation water containing alkaline earth metal ions and the cresylates forming insoluble alkaline earth metal cresylates.
4. Contacting the calcareous formation itself with Group I streams may cause precipitation of calcium or barium cresylates.

5. Mixing Group I and Group II streams will cause iron sulfide, alkaline earth metal cresylates and/or iron hydroxide to form when contact with the formation and formation water is attained upon injection.

I have found that all of these problems may be solved by lowering the pH of the streams to the acidic range before mixing the streams as they are mixed or after mixing. The precipitates which would normally form in an alkaline medium will not form or will dissolve in an acidic medium, with the exception of the freed cresylic acids which will "oil out" as a layer over the aqueous acidic medium. These cresylic acids may be removed by skimming or other means well known in the art. The pH should be lowered to about 5 to 7, but in any event sufficiently low to prevent precipitation or to provide near complete dissolution of existing precipitate and, if desired, to insure "oiling out" of any cresylic acids present. It is especially preferred to lower the pH to about 5. The pH may be lowered by use of an acid, preferably the mineral acid hydrochloric (HCl). Though sulfuric acid ($H_2SO_4$) may be used, there is a strong likelihood that gypsum ($CaSO_4 \cdot 2H_2O$) would precipitate and plug the formation.

In one embodiment of my invention the streams are lowered to a pH value in the acidic range before the streams reach the subterranean formation. This will dissolve the precipitates already formed and inhibit the formation of any further precipitates. This embodiment may be carried out by lowering the pH of each individual stream before mixing or by lowering the pH of the streams after mixing commences and before the mixed streams reach the formation face.

In another embodiment of my invention an injection well which has been plugged with precipitate at the formation face may be reopened for injection by contacting the formation with an acidic solution to dissolve precipitate already formed. This may be done in a variety of ways known to those skilled in the art including, for example, inserting tubing into the well and circulating acidic fluid past the formation face. If the precipitate has plugged the formation for some distance away from the well bore a fracturing technique may be used to inject some acidic fluid into the formation so as to contact the precipitate and dissolve it. This is not to be confused with the common procedure of "acidizing" a well wherein acid is injected into a formation to dissolve the formation rock itself. My invention is to contact solid precipitate with an acidic solution and dissolve the precipitate.

EXPERIMENTAL

Injectivity tests of effluent waste streams from an industrial plant were made to determine whether and how extensively precipitation occurs upon mixing these various streams together and with representative formation waters.

The injectivity measurements were carried out with a device used routinely in oil field practice to determine plugging tendency of a liquid stream toward a formation face. The rate of flow of the stream across a millipore filter (0.45 micron pore size) at a constant head pressure was measured. As suspended matter accumulates upon the filter face, thus plugging the pores, the flow rate decreases (incremental time for passage of incremental volume increases), simulating formation face plugging. A measurement using distilled water was made for comparison purposes.

Results

Plugging tendency of each separate stream and their mixtures via Millipore injectivity tests are shown in Tables 1 and 2.

In Table 3 the results of mixing the effluent streams and their mixtures with representative formation waters from the Salem Field are depicted.

Discussion and conclusions

1. All individual streams except $P_1$, G, and $P_2$ have good individual injectivities. The extremely poor injectivities of $P_1$ and $P_2$ are attributable to oil carry-over and emulsion formation in the case of $P_1$, and inadequate sedimentation of suspended solids from river water in the case of $P_2$. The suspended or emulsified matter in these streams must be more efficiently removed by chemical and mechanical pre-treatment filtration, coagulation, sedimentation, etc., before their injection may be contemplated. The injectivity of stream G was acceptable even though not as good as most of the other streams.

2. The separate mixing of both the Group I streams with other Group I streams and the Group II streams with other Group II streams results in diminished injectivity in both cases.

a. In the case of Group I, combination of dissolved iron in A stream effluent water, and sulfide in B and F streams, probably produced a precipitate of iron sulfide. In addition, insoluble calcium (and possibly barium) cresylates, from combination of cresylates in C stream and E stream with calcium (and barium) in A stream, were formed. Further, precipitation of lead sulfide, by combination of dissolved lead in D stream with sulfide from above cited sources is suspected.

b. Injectivity of the Group II mixture was diminished by precipitation of an orange-brown colloidal solid, much like iron hydroxide in appearance. If the G stream is omitted from the mixture, no precipitation occurs after standing overnight. The iron therefore appears to be furnished by this stream. The hydroxide ion in this mixture is furnished by the highly alkaline L stream.

It is believed that both these stream mixtures would eventually plug a formation (unless highly fractured), even if they are compatible with connate formation water.

When the pH of these two separate stream mixtures is lowered to about 5, the formed precipitates dissolve in each case, as evidenced by ½ hour centrifugation of the acidified stream mixtures. The sulfides are acid-soluble and the calcium (or barium) cresylates dissolve, allowing the free cresylic acid to "oil out" on the surface of the aqueous mixture from which it may be removed by skimming or other conventional means. Exposure of the acidified mixtures to an Illinois limestone core (calcium carbonate) for one hour produced no precipitate as evidenced by 15 minutes centrifugation of the exposed solution or dissolution of the core as evidenced by evolution of carbon dioxide gas. It is concluded that pre-treatment of both the mixed streams with acid to produce a pH of 5 would allow injection of a solids-free solution which would be compatible with a limestone formation, assuming the solutions are compatible with the connate water itself.

3. Exposure of the Group I mixture to a representative formation water produced a heavy precipitate (Table 3). This precipitation is due to the reaction of the basic cresylates with calcium (and barium) in the formation water. The addition of formation water to the Group II mixture resulted in no precipitation since neither the Group II mixture nor the formation water contained ions which when mixed would precipitate.

Reduction of pH to about 5 solubilized the precipitates formed freeing the cresylic acid which "oiled out" as a separate phase when the Group I mixture was exposed to the representative formation water. It may be concluded therefore that acidification can render each separate stream compatible with the connate water.

4. A three component mixture formed by adding the two Millipore filtered effluent stream mixtures (Groups I and II) to formation water 1:1:1 proportion by volume resulted in copious precipitation. This precipitate probably consists of a mixture of insoluble sulfides, hydrous iron oxides and the insoluble calcium (and barium) cresylates. Reduction of the pH of this triple mixture to five resulted in complete dissolution of the precipitate and "oiling out" of the cresylic and as a surface layer. Exposure of an Illinois limestone core to the acidified (pH about 5) solution resulted in no precipitation nor evolution of gas (carbon dioxide) over an hour's exposure. It may be concluded, thereof, that lowering of pH can produce a solids-free solution when both Groups I and II are mixed with a representative connate water and limestone formation.

TABLE 1.—MILLIPORE INJECTIVITY TESTS ON GROUP I STREAMS
[20 p.s.i.]

| | Volume, ml. | | | | | | | | | |
|---|---|---|---|---|---|---|---|---|---|---|
| | 100 | 200 | 300 | 400 | 500 | 600 | 700 | 800 | 900 | 1,000 |
| Stream, seconds: | | | | | | | | | | |
| A | 9 | 17 | 26 | 35 | 44 | 55 | 66 | 78 | 90 | 103 |
| B | 32 | 53 | 66 | 79 | 91 | 104 | 115 | 127 | 139 | 151 |
| C | 9 | 17 | 26 | 36 | 50 | 64 | 81 | 99 | 118 | 137 |
| D | 42 | 104 | 162 | 210 | 264 | 325 | 400 | 500 | 608 | 725 |
| E | 19 | 42 | 68 | 99 | 128 | 156 | 180 | 208 | 232 | 254 |
| F | 18 | 44 | 60 | 74 | 88 | Millipore disintegrated | | | | |
| Mixture of above, seconds | 10 | 18 | 35 | 79 | 215 | 498 | 1,290 | 1,840 | | |
| Distilled water, seconds | 10 | 19 | 29 | 39 | 50 | 62 | 75 | 88 | 102 | 117 |

TABLE 2.—MILLIPORE INJECTIVITY TESTS ON GROUP II STREAMS
[20 p.s.i.]

| | Volume, ml. | | | | | | | | | |
|---|---|---|---|---|---|---|---|---|---|---|
| | 100 | 200 | 300 | 400 | 500 | 600 | 700 | 800 | 900 | 1,000 |
| Stream, seconds: | | | | | | | | | | |
| $P_1$ | 120 | 540 | 1,380 | | | | | | | |
| G | 17 | 65 | 115 | 245 | 347 | 460 | 585 | 720 | 870 | 1,035 |
| H | 9 | 17 | 26 | 35 | 44 | 54 | 65 | 77 | 90 | 105 |
| J | 10 | 19 | 28 | 37 | 46 | 55 | 65 | 74 | 83 | 93 |
| $P_2$ | 720 | Millipore plugged | | | | | | | | |
| K | 15 | 38 | 70 | 112 | 160 | 219 | 285 | 355 | 437 | 527 |
| L | 10 | 18 | 27 | 35 | 44 | 53 | 62 | 72 | 81 | 91 |
| Mixture of above,[1] seconds | 35 | 173 | 290 | 380 | 585 | 825 | 1,080 | 1,340 | 1,620 | |
| Distilled water, seconds | 10 | 19 | 29 | 39 | 50 | 62 | 75 | 88 | 102 | 117 |

[1] Excluding P and $P_2$.

TABLE 3.—COMPATIBILITY OF EFFLUENT STREAMS AND THEIR MIXTURES WITH REPRESENTATIVE FORMATION WATERS

| | Stream plus— | |
|---|---|---|
| | Warsaw water | Salem water |
| Stream: | | |
| A | No precipitate | No precipitate. |
| B | Heavy white precipitate | Heavy white precipitate. |
| C | Heavy precipitate | Milky solution. |
| D | Heavy orange precipitate | Heavy orange precipitate. |
| E | do | Do. |
| F | Heavy white precipitate | Heavy white precipitate. |
| Mixture of above [1] | Heavy precipitate | Heavy precipitate. |
| G | Not run | No precipitate. |
| H | do | Do. |
| J | do | Do. |
| K | do | Not run. |
| L | do | No precipitate. |
| Mixture of above [1] | do | Do. |
| Proportion of two mixtures (1:1) [1] | do | Heavy precipitate. |

[1] After millipore filtration.

I claim:

1. A process for disposing of an aqueous waste stream wherein the waste stream comprises a mixture of at least two waste streams, a first waste stream and a second waste stream, the first said waste stream comprising sulfides, cresylates and soluble iron salts and the second said waste stream comprising alkaline earth metal ions comprising
   acidifying said waste stream mixture to a pH of about 5 or lower with an acid comprising hydrochloric acid to inhibit the formation of any precipitate in said waste stream or dissolve any precipitate already formed and
   injecting the acidified waste stream into a subterranean formation.

2. A process for dissolving a precipitate in a waste disposal system wherein the precipitate is the result of contact between a first aqueous stream and a second aqueous stream, the first stream comprising sulfides, cresylates and soluble iron salts and the second stream comprising alkaline earth metal ions comprising
   contacting the precipitate with an aqueous solution comprising hydrochloric acid having a pH of about 5 or lower.

References Cited
UNITED STATES PATENTS

| 3,106,525 | 10/1963 | Schmid et al. | 210—57 |
| 3,654,993 | 4/1972 | Smith et al. | 166—300 X |
| 3,704,750 | 12/1972 | Miles et al. | 252—8.55 R |

SAMIH N. ZAHARNA, Primary Examiner

T. G. WYSE, Assistant Examiner

U.S. Cl. X.R.

166—304; 252—8.55